United States Patent [19]

Gundy

[11] Patent Number: 5,490,750
[45] Date of Patent: Feb. 13, 1996

[54] ANCHORING DEVICE FOR A THREADED MEMBER

[76] Inventor: William P. Gundy, 250 Elm St., Milford, N.H. 03051

[21] Appl. No.: 257,838

[22] Filed: Jun. 9, 1994

[51] Int. Cl.⁶ ..................................................... F16B 13/06
[52] U.S. Cl. .............................. 411/55; 411/73; 411/901; 411/908
[58] Field of Search ................................. 411/55, 57, 60, 411/71–73, 902, 903, 908, 901

[56] References Cited

U.S. PATENT DOCUMENTS

| | | |
|---|---|---|
| 702,255 | 6/1902 | Stockman .................................. 411/60 |
| 808,401 | 12/1905 | Percival . |
| 1,057,975 | 4/1913 | Newhall . |
| 1,116,545 | 11/1914 | Barrett . |
| 1,138,219 | 5/1915 | Hottenroth . |
| 1,168,770 | 1/1916 | Wagner . |
| 1,570,234 | 1/1926 | Feldmar . |
| 2,545,045 | 3/1951 | Rosan . |
| 2,573,498 | 10/1951 | Scott . |
| 2,718,485 | 9/1955 | Samuely .............................. 154/126.5 |
| 3,434,261 | 3/1969 | Rohe ......................................... 52/617 |
| 3,621,557 | 11/1971 | Cushman ................................ 530/151 |
| 3,783,921 | 1/1974 | Wagner . |
| 3,897,713 | 8/1975 | Gugle . |
| 4,085,652 | 4/1978 | Vanotti . |
| 4,360,301 | 11/1982 | Mosberger ............................ 411/73 X |
| 4,840,522 | 6/1989 | Kurihara .............................. 411/903 X |
| 5,085,547 | 2/1992 | Vanotti ...................................... 411/72 |
| 5,345,734 | 9/1994 | Tremblay ............................. 411/903 X |

FOREIGN PATENT DOCUMENTS

| | | |
|---|---|---|
| 0081252 | 6/1983 | European Pat. Off. . |
| 1575163 | 6/1969 | France . |
| 2327886 | 9/1970 | France . |
| 2425014 | 6/1975 | France . |
| 7519908 | 6/1976 | France . |
| 908531 | 4/1954 | Germany . |
| 2449470 | 4/1975 | Germany . |
| 2434713 | 2/1976 | Germany ............................... 411/73 |
| 2627746 | 1/1977 | Germany . |
| 1578146 | 11/1980 | United Kingdom . |

OTHER PUBLICATIONS 3 sheets of information pertaining to buttress threads copied from an engineering handbook. Pp. 1327, 1327, 1330, 1331, 1332, 1333.

*Primary Examiner*—Neill R. Wilson
*Attorney, Agent, or Firm*—Daniel J. Bourque; Kevin J. Carroll; David D. Lowry

[57] ABSTRACT

An anchoring device for anchoring a threaded member in a substrate material includes a plastic anchoring sheath for receiving the screw. The plastic anchoring sheath includes annular anchoring ribs formed around a body portion of the anchoring sheath and at least three longitudinal ribs extending along at least a portion of the body portion of the anchoring sheath preferably parallel to a longitudinal axis of the anchoring sheath. The longitudinal ribs extend outwardly from the anchoring sheath and lie in different planes which intersect at the longitudinal axis of the anchoring sheath. The anchoring sheath preferably includes top and bottom regions which have no annular or longitudinal ribs. The plastic anchoring sheath may be coated with a resilient, elastomeric coating.

16 Claims, 3 Drawing Sheets

ANCHORING DEVICE FOR A THREADED MEMBER

FIELD OF THE INVENTION

This invention relates to an anchoring device for anchoring a threaded member in a substrate material.

BACKGROUND OF THE INVENTION

Earlier devices exist which fix screws and other threaded members in a substrate such as an agglomerated material including concrete, plaster and epoxy. Two such screw fixing devices are disclosed in U.S. Pat. Nos. 4,085,652 and 5,085,547. The previous screw fixing devices include a sheath embedded into the substrate and into which the screw is threaded.

While the sheaths of the above-referenced devices enable the screw to be easily secured in the substrate, such screw fixing devices have some deficiencies. U.S. Pat. No. 4,085,652 discloses an anchoring device with an overmolded sheath FIG. 1, which has circular ribs and four axial ribs. However, this design of the overmolded sheath makes the screw impossible to remove.

U.S. Pat. No. 5,085,547 improves the screw fixing device by providing a plastic sheath, FIG. 2, into which a screw is threaded and adds a metal sheath surrounding the plastic sheath. The metal sheath is embedded in the substrate and has longitudinal ribs which prevent the sheath from rotating when the screw is threaded into the plastic sheath (FIG. 2).

The design of the sheath in the previous screw fixing devices having two longitudinal ribs which are positioned opposite each other is disadvantageous. The longitudinal ribs can create fragile zones 1, Prior Art FIG. 1, in a substrate such as concrete where moisture and stresses on the screw may cause cracking in the substrate. Because the longitudinal ribs lie in the same plane, the fragile zones in the substrate also lie in the same plane and the forces acting on the screw and sheath will be concentrated in that plane.

Furthermore, the longitudinal ribs of the screw fixing devices extend too close to the top and bottom of the screw fixing sheath. Having the ribs close to the top of the screw fixing sheath causes fragile zones in the weaker top layer of the substrate which is more susceptible to fracturing by forces applied to the screw. Having the ribs extend to the bottom of the sheath below the end of the screw also causes fragile zones at the end area in the sheath.

Another problem with previous screw fixing devices involved the contamination of the interior of the sheath with water and other debris. During manufacturing and shipping of the screw fixing sheath, water and debris could enter the threaded interior of the sheath causing problems when a screw is threaded into the sheath. Further, after the screw has been threaded into the sheath water could seep in causing corrosion and damage from expansion when the water freezes.

Accordingly, what is needed is a screw fixing or anchoring device having a sheath which does not create fragile zones in the substrate where forces may be concentrated in a plane, causing the substrate to fracture. An anchoring sheath must be provided which has at least three ribs spaced around the sheath which do not lie in the same plane, for distributing the forces and preventing the forces from concentrating in a single plane in the substrate and for preventing the sheath from rotating when a screw is threaded into or removed from the sheath. Furthermore, an anchoring sheath is needed which reduces the zones in the substrate which are susceptible to being fractured at the top and bottom of the anchoring sheath. Finally, the screw fixing sheath should have a sealable opening to prevent damage from water and other debris.

SUMMARY OF THE INVENTION

The present invention is an anchoring device for anchoring a threaded member in an agglomerated or other type of substrate material, such as concrete, plaster or epoxy. The anchoring device includes a plastic anchoring sheath which is fixed in the substrate material and receives the threaded member. The plastic anchoring sheath has a first end, a second end, and a body portion disposed between the first and second ends. The plastic anchoring sheath further includes a plurality of annular anchoring ribs formed around the body portion for preventing the anchoring sheath from being removed or pulled out from the substrate material.

In the preferred embodiment, the plastic anchoring sheath is made of a nylon material. The anchoring sheath may include an elastomeric or resilient type coating formed directly on the plastic material, such as a resilient rubber type coating or a resilient plastic coating. Alternatively, the elastomeric or resilient type coating may be in the form of a sheet which is wrapped and heat shrunk around the anchoring sheath.

The anchoring sheath also includes at least three longitudinal ribs extending along at least a segment of the body portion of the anchoring sheath. In one embodiment, the longitudinal ribs may extend from a top annular anchoring rib to a bottom annular anchoring rib. Each of the longitudinal ribs lie in different planes which may intersect at the longitudinal axis of the anchoring sheath. In one embodiment, the anchoring sheath includes four annular anchoring ribs and three, longitudinal ribs having a generally triangular cross section spaced around the body portion of the anchoring sheath at approximately 120 degrees apart.

The anchoring sheath includes a top region between the first end of the anchoring sheath and a top annular rib of, the plurality of anchoring ribs. The top region includes an exterior surface having no annular anchoring rib or longitudinal rib, and extending from the top annular rib to the first end. The preferred embodiment of the anchoring sheath further includes a cylindrical bottom region with no anchoring rib or no longitudinal rib between the second end of the anchoring sheath and a bottom annular rib of the plurality of annular anchoring ribs.

In the preferred embodiment, the top region includes a shoulder having a top surface which is flush with the first end of the anchoring sheath. A water-tight seal member formed of elastomeric or rubber type material is provided proximate the shoulder.

In an alternative embodiment, the interior surface of the top region includes an annular shaped sealing member which forms a water-tight seal with a sealing cap or plug which has been inserted into the anchoring sheath or a sheath cap.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
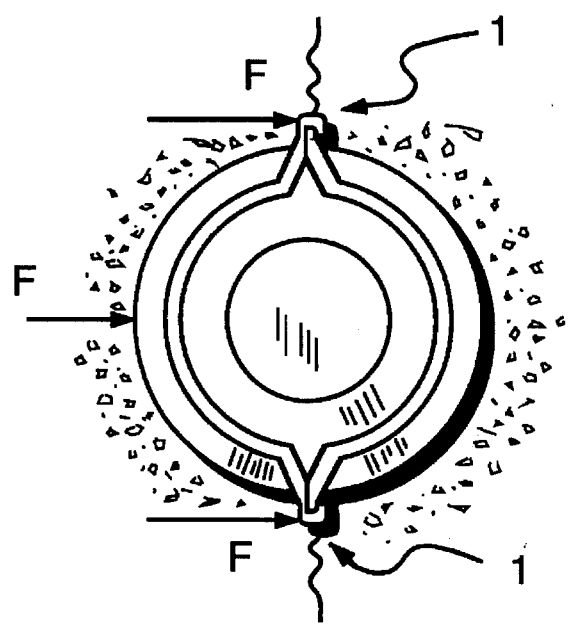
FIG. 1 is a top view of a prior art screw fixing device having two ribs lying in the same plane.
Figure 2:
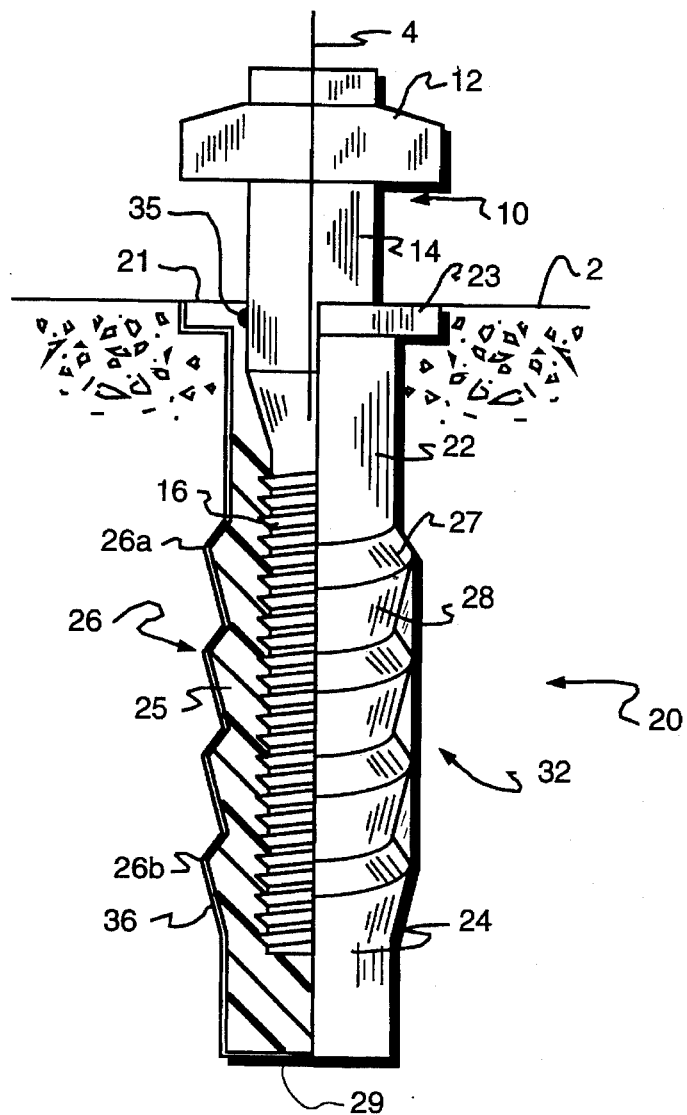
FIG. 2 is an axial half-section through an anchoring sheath of the anchoring device according to the present invention.

The anchoring system, as shown in FIG. 2, includes an anchoring sheath 20 which is embedded in an agglomerated or other type of substrate material 2, such as plaster, concrete and epoxy. A threaded member 10, such as a screw, bolt or threaded stud, is inserted into the anchoring sheath 20 so that the threaded member 10 may be securely anchored in the substrate 2. Typically, the threaded member 10 includes a head 12 and a rod or body portion 14 with threads 16 which are threaded into a threaded portion of a bore 34 in the anchoring sheath 20. In the preferred embodiment, threads 16 are buttress threads which offer superior resistance to cross threading when the threaded member 10 is being inserted into the sheath. Most importantly, the buttress thread offers superior resistance to forces applied to the achoring device along the axis of the threaded member 10 which might otherwise cause the threaded member to be "pulled out" of the anchoring device.

The anchoring sheath 20 is made of a plastic material which is preferably a reinforced plastic, such as glass fiber reinforced nylon. The anchoring sheath 20 includes annular anchoring ribs 26 positioned along a body portion 25 of the anchoring sheath 20, for preventing the anchoring sheath 20 from being removed or pulled out from the substrate material. Each annular anchoring rib 26 may have a generally triangular cross section including a downwardly tapered top surface 27 which meets an upwardly and outwardly tapered bottom surface 28.

Figure 4:
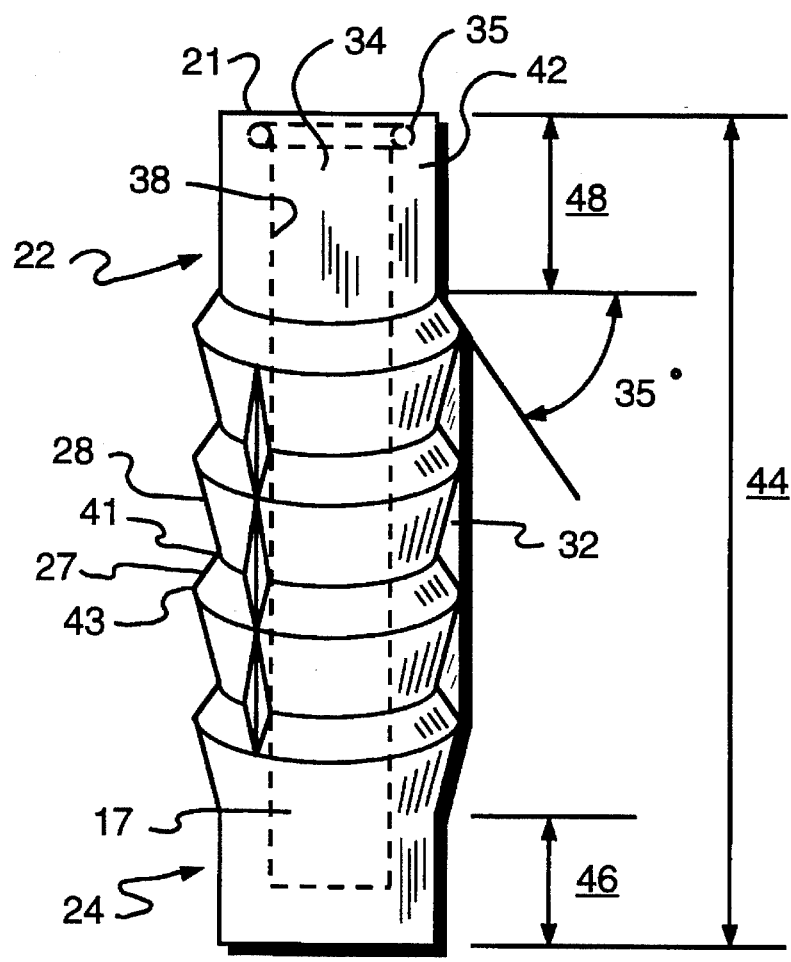
FIG. 4 is a side view of an anchoring sheath according to another embodiment of the present invention.

In the preferred embodiment, the downwardly tapered top surface 27 and outwardly tapered bottom surfaces 28 of the annular anchoring ribs form rib edges 43 and corner regions 41 which are slightly rounded, as shown in FIG. 4. The rib edge 43 and corner region 41 of each annular anchoring rib 26 are slightly rounded to allow a substrate material to easily flow around the annular ribs and to prevent voids or pockets in the substrate material to ensure maximum contact between the substrate and the anchoring sheath. Typically, the top surface 27 of each annular anchoring rib 26 is tapered at approximately a 35 degree angle (FIG. 4).

Figure 3:
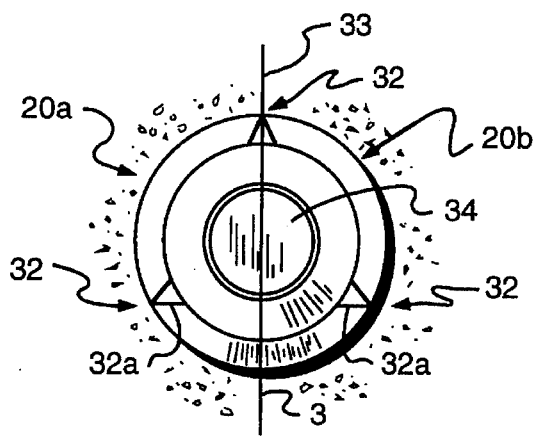
FIG. 3 is a top view of the anchoring sheath according to the present invention.

The anchoring sheath 20 further includes longitudinal ribs 32 which extend along at least a segment of the body portion 25 of the anchoring sheath 20, to prevent the anchoring sheath from rotating in the substrate material 2 when the threaded member 10 is threaded into or out of the sheath 20. In one embodiment, longitudinal ribs 32 extend parallel to a longitudinal axis of the anchoring sheath 20 from a top surface 27 of top annular rib 26a to a top surface 27 of bottom annular rib 26b (FIGS. 2 and 4). Each longitudinal rib 32 also extends outwardly from the anchoring sheath to an outer edge 33 of the longitudinal rib 32 which is generally approximately flush with rib edges 43 of the annular ribs 26, as shown in FIG. 3. Typically, the longitudinal ribs 32 each have a generally triangular cross-section (FIG. 3) although other shapes are within the scope of the present invention.

In the preferred embodiment, the anchoring sheath 20 includes three longitudinal ribs 32 which are spaced approximately 120 degrees apart around the body portion 25 of the anchoring sheath 20 as shown in FIG. 3. In this embodiment, each longitudinal rib 32 lies in a plane which intersects the longitudinal axis 4 of the anchoring sheath 20 and none of the longitudinal ribs 32 lie in the same plane intersecting the longitudinal axis 4 of the anchoring sheath 20.

Also in this preferred embodiment, the sides 32a of two of the long ribs 32 should lie in the same plane, as shown in FIG. 3. This will allow the anchoring sheath 20 to be molded using a two piece mold which separates along the plane of sides 32a of two of the longitudinal ribs. One piece of the mold forms a first portion 20a of the anchoring sheath 20 while a second piece of the mold forms a second portion 20b of the anchoring sheath. After the plastic material has hardened, the two pieces may easily be separated along this longitudinal plane 3.

Other embodiments may include more than three longitudinal ribs provided that no two longitudinal ribs lie in the same plane intersecting the longitudinal axis 4 of the anchoring sheath 20. Having the longitudinal ribs 32 lie in different-planes on the anchoring sheath 20 allows the forces on the anchoring sheath 20 and the resulting forces on the longitudinal ribs 32 to be distributed evenly throughout the surrounding substrate material preventing concentration in a single plane and fracturing of the substrate material.

In the preferred embodiment, the anchoring sheath 20 further includes a top region 22 without both annular ribs and longitudinal ribs. The top region 22 extends from a top annular anchoring rib 26a to a first end 21 of the anchoring sheath 20. In one embodiment shown in FIG. 2, the top region 22 includes a shoulder 23 having a top surface flush with the first end 21 of the anchoring sheath 20. In an alternative embodiment shown in FIG. 4, the top region 22 has an exterior surface 42 which extends from the top annular anchoring rib 26a straight to the first end 21 of the anchoring sheath 20 without any ribs or shoulders. This top region 22 having no annular anchoring ribs or longitudinal ribs reduces forces in the top layer of the substrate material 2 which is more susceptible to fracturing.

Figure 5:
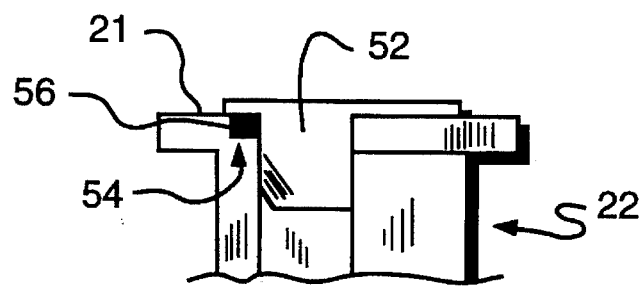
FIG. 5 is a partial side view of an anchoring sheath having a water-tight seal plug according to another embodiment of the present invention.

The bore 34, FIGS. 3 and 4, in the top region 22 of the anchoring sheath 20 includes an interior surface 38. In the preferred embodiment, this interior surface 38 includes a groove having a neoprene, rubber or other similar elastomeric type sealing ring 35, such as an "O" ring, positioned in the groove so as to contact the rod 14 of a threaded member 10 which is threaded in the anchoring sheath 20 (see FIG. 2). The sealing ring 35 forms a water-tight seal with the threaded member 10 or a cap or plug 52, FIG. 5, to prevent water and other debris from entering the bore 34 of the anchoring sheath 20 and causing damage. In the preferred embodiment, shown in FIG. 5, a groove or cavity 54 is formed with an elastomeric type seal member 56 at the first end 21 of the anchoring sheath 20. A plug or cap 52 may be inserted into the bore 34 of the anchoring sheath 20 adjacent the seal 56 for eliminating water and debris from entering the anchoring sheath during manufacturing, shipping or use.

The preferred embodiment of the anchoring sheath 20 also includes a bottom region 24 which has no annular anchoring ribs and which has a cylindrical surface extending from the bottom annular anchoring rib 26b to a second end 29 of the anchoring sheath 20 (FIG. 2). This bottom region 24 includes a pocket 17 which is threaded and allows for a greater range of bolt lengths (see FIGS. 2 and 4).

The number of annular anchoring ribs 26 and the dimensions of the anchoring sheath 20 will depend on the lengths of the threaded members which are used. For example, in the preferred embodiments shown in FIGS. 2 and 4, the anchoring sheath has four annular anchoring ribs 26. Typically, in this embodiment, the length 44 of the anchoring sheath 20 is approximately 5.5 inches to accommodate a ⅞ inch diameter bolt with a 3.25 to 4.25 inch threaded region, while the length 46 of the top region 22 is approximately 2.0 inches. However, other embodiments of the anchoring sheath 20 may include less than four or as many as seven or more annular anchoring ribs 26 depending on the length of the threaded member 10.

The anchoring sheath 20 may further include an optional elastomeric or resilient coating 36 formed directly on the plastic material, FIG. 2, to allow for expansion and contraction differential of the anchoring sheath 20 and the substrate 2, and for providing an even distribution of load between the anchoring sheath and the substrate. Preferably, the resilient coating is applied by dipping or spraying the anchoring sheath 20 with elastomeric or resilient material and allowed to dry. Alternatively, an elastomeric or resilient type of coating comprising a sheet of material may be wrapped around the anchoring sheath and shrink wrapped around the anchoring sheath.

Resilient or elastomeric coatings may be utilized including, for example, natural and synthetic rubber materials such as latex, neoprene, butyl, nitrile, as well as resilient plastic coatings including, for example, the family of thermal plastic elastomers (TPE) such as Polyvinyl Chloride (PVC), polyimides, etc. This list is not considered to be limiting but is presented to illustrate those types of coatings which are considered to be within the scope of the present invention.

Modifications and substitutions by one of ordinary skill in the art are considered to be within the scope of the present invention which is not to be limited except by the claims which follow.

What is claimed is:

1. An anchoring device for anchoring a threaded member in a substrate material, comprising:

a plastic anchoring sheath having a first end, a second end, and a body portion disposed between said first and said second end, said plastic anchoring sheath adapted to be fixed in said substrate material and to receive a treaded member;

a plurality of annular anchoring ribs formed around the body portion of said anchoring sheath; and at least three longitudinal ribs extending along at least a segment of said body portion of said plastic anchoring sheath, each of said at least three longitudinal ribs extending outwardly from said anchoring sheath and disposed in different planes which intersect at a longitudinal axis of said anchoring sheath.

2. The anchoring device of claim 1, wherein said at least 3 longitudinal ribs are disposed parallel to said longitudinal axis of said anchoring sheath.

3. The anchoring device of claim 2, wherein said at least three longitudinal ribs include three longitudinal ribs spaced around the body portion of said anchoring sheath at approximately 120 degrees apart.

4. The anchoring device of claim 1, wherein said plastic anchoring sheath is made of a nylon material.

5. The anchoring device of claim 1, further including a coating formed on at least a portion of an exterior region of said plastic anchoring sheath.

6. The anchoring device of claim 5, wherein said coating includes a resilient coating.

7. The anchoring device of claim 1, further including a top region between said first end of said anchoring sheath and a top annular rib of said plurality of annular anchoring ribs, wherein said top region includes an exterior surface devoid of an annular anchoring rib and extending straight from said top annular rib of said plurality of annular anchoring ribs to said first end of said anchoring sheath.

8. The anchoring device of claim 1, further including a top region between said first end of said anchoring sheath and a top annular rib of said plurality of annular anchoring ribs, wherein said top region includes a shoulder having a top surface flush with said first end of said anchoring sheath.

9. The anchoring device of claim 1, further including a bore in said plastic anchoring sheath for receiving a threaded member, wherein said bore includes an interior surface and a sealing means positioned proximate said interior surface, for forming a watertight seal and preventing contaminants from entering the bore of said anchoring sheath.

10. The anchoring device of claim 1, further including a bottom region between said second end of said anchoring sheath and a bottom annular rib of said plurality of annular anchoring ribs, wherein said bottom region is devoid of annular anchoring ribs.

11. The anchoring device of claim 1, wherein each of said plurality of annular anchoring ribs have a generally triangular cross-section.

12. The anchoring device of claim 1, wherein each of said at least three longitudinal ribs have a generally triangular cross-section.

13. The anchoring device of claim 1, wherein said threaded member includes buttress threads, and a threaded portion of an inside region of said anchoring sheath is adapted to receive a buttress threaded member.

14. An anchoring system for anchoring a threaded member in an substrate material, comprising:

a plastic anchoring sheath fixed in a substrate material, said anchoring sheath including a first end, a second end, and a body portion disposed between said first and second end;

a plurality of annular anchoring ribs formed around the body portion of said anchoring sheath, each of said plurality of annular anchoring ribs having a generally triangular cross-section;

said anchoring sheath including a top region disposed between said first end of said anchoring sheath and a top annular rib of said plurality of annular ribs, said top region being devoid of an annular anchoring rib;

said plastic anchoring sheath including a bottom region disposed between said second end of said anchoring sheath and a bottom annular rib of said plurality of said annular anchoring ribs, said bottom region being devoid of an annular anchoring rib;

at least three longitudinal ribs extending along at least a segment of the body portion of said plastic anchoring sheath parallel to a longitudinal axis of said anchoring sheath and extending outwardly from said anchoring sheath, each of said at least three longitudinal ribs disposed in different planes which intersect at the longitudinal axis of said anchoring sheath; and a resilient coating formed directly on said plastic anchoring sheath covering at least a portion of an exterior surface of said anchoring sheath.

15. An anchoring device for anchoring a threaded member in a substrate material, comprising:

a plastic anchoring sheath having a first end, a second end and a body portion disposed between said first and second ends, said plastic anchoring sheath adapted to be fixed in said substrate material and to receive a threaded member;

a plurality of annular anchoring ribs formed around the body portion of said anchoring sheaths;

a bottom region between said second end of said anchoring sheath and a bottom annular anchoring rib of said plurality of annular anchoring ribs, wherein said bottom region is devoid of annular anchoring ribs; and at least three longitudinal ribs extending along at least a segment of said body portion of said plastic anchoring sheath, each of said at least three longitudinal ribs extending outwardly from said anchoring sheath and disposed in different planes which intersect at a longitudinal axis of said anchoring sheath.

16. An anchoring system for anchoring a threaded member in an substrate material, comprising:

a plastic anchoring sheath fixed in a substrate material, said anchoring sheath including a first end, a second end, and a body portion disposed between said first and second end;

a plurality of annular anchoring ribs formed around the body portion of said anchoring sheath, each of said plurality of annular anchoring ribs having a generally triangular cross-section;

said anchoring sheath including a top region disposed between said first end of said anchoring sheath and a top annular rib of said plurality of annular ribs, said top region being devoid of an annular anchoring rib;

said plastic anchoring sheath including a bottom region disposed between said second end of said anchoring sheath and a bottom annular rib of said plurality of said annular anchoring ribs, said bottom region being devoid of an annular anchoring rib; and at least three longitudinal ribs extending along at least a segment of the body portion of said plastic anchoring sheath parallel to a longitudinal axis of said anchoring sheath and extending outwardly from said anchoring sheath, each of said at least three longitudinal ribs disposed in different planes which intersect at the longitudinal axis of said anchoring sheath.

* * * * *

UNITED STATES PATENT AND TRADEMARK OFFICE
CERTIFICATE OF CORRECTION

| | | |
|---|---|---|
| PATENT NO. | : 5,490,750 | Page 1 of 1 |
| APPLICATION NO. | : 08/257838 | |
| DATED | : February 13, 1996 | |
| INVENTOR(S) | : William P. Gundy | |

It is certified that error appears in the above-identified patent and that said Letters Patent is hereby corrected as shown below:

Claim 1, Column 5, Line 48, delete "treaded" and insert --threaded--

Claim 15, Column 7, Line 9, delete "sheaths" and insert --sheath--

Signed and Sealed this

Fourth Day of September, 2012

David J. Kappos
*Director of the United States Patent and Trademark Office*